(12) United States Patent
Clift et al.

(10) Patent No.: US 7,428,539 B2
(45) Date of Patent: Sep. 23, 2008

(54) METHOD, SYSTEM, AND APPARATUS FOR MANAGING ACCESS TO A DATA OBJECT

(75) Inventors: Neill M Clift, Kirkland, WA (US); Adrian Marinescu, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 375 days.

(21) Appl. No.: 10/872,722

(22) Filed: Jun. 21, 2004

(65) Prior Publication Data

US 2006/0004760 A1 Jan. 5, 2006

(51) Int. Cl.
*G06F 17/30* (2006.01)
(52) U.S. Cl. ............................ 707/8; 707/2; 707/103 R; 707/103 Y
(58) Field of Classification Search ................. 707/200, 707/1, 2, 8, 103 R–103 Z
See application file for complete search history.

(56) References Cited

U.S. PATENT DOCUMENTS

| | | | | | |
|---|---|---|---|---|---|
| 5,285,528 A | * | 2/1994 | Hart | ........................... | 710/200 |
| 5,826,253 A | * | 10/1998 | Bredenberg | ..................... | 707/2 |
| 2004/0199734 A1 | * | 10/2004 | Rajamani et al. | ............. | 711/163 |
| 2005/0234989 A1 | * | 10/2005 | Bailey et al. | ............. | 707/104.1 |

OTHER PUBLICATIONS

Bacon, D.F., et al., "Thin Locks: Featherweight Synchronization for Java," *Proceedings of the ACM Conf. on Programming Language Design and Implementation*, SIGPLAN Notices vol. 33(6), Montreal, Canada, Jun. 1998.

Mellor-Crummey, J.M., et al., "Synchronization Without Contention," *Proceedings of the 4th Int'l Conf. on Architectural Support for Programming Languages and Systems*, Santa Clara, Calif., Apr. 1991, pp. 269-278.

\* cited by examiner

*Primary Examiner*—Cheryl Lewis
(74) *Attorney, Agent, or Firm*—Christensen O'Connor; Johnson Kindness PLLC

(57) ABSTRACT

In accordance with an embodiment of this invention, a mechanism for managing a plurality of access requests for a data object is provided. The mechanism includes a lock control identifying whether a requested data object is in use and a waiter control identifying whether at least one of the plurality of access requests have been denied immediate access to the data object and is currently waiting for access to the data object. Additionally, the mechanism maintains a list optimize control identifying whether one of the plurality of access requests is currently optimizing a waiters list of access requests waiting to access to the data object.

34 Claims, 14 Drawing Sheets

METHOD, SYSTEM, AND APPARATUS FOR MANAGING ACCESS TO A DATA OBJECT

FIELD OF THE INVENTION

In general, the present application relates to computer software in a multi-threaded computing environment, and, more particularly, to a system and method for managing multiple requests to access a data object by employing a locking mechanism for the data object.

BACKGROUND OF THE INVENTION

Traditionally, computing environments in which computer programs are run have been single threaded. A "thread," as used herein, is part of a program that can execute independently of other parts of the program. Accordingly, a single threaded environment requires that only one thread of a program may be executed at a time. This places constraints on both users and programs because users are only able to run one program at a time and that program is only able to execute a single thread at a time.

To overcome the deficiencies associated with single threaded environments, computing environments have been created that are multi-threaded. "Multi-threaded," as used herein, is the ability of an operating system to execute different parts of a program, or programs, called threads, simultaneously. Accordingly, a program is typically able to run multiple threads concurrently. For example, a spreadsheet program may calculate a complex formula taking minutes to complete while at the same time permitting the user to continue editing the spreadsheet. Additionally, a user may be able to run threads from different applications at the same time.

However, a problem arises when two or more threads of the same or different programs attempt to access the same "data object." A "data object" as used herein may be any type of data stored on a computing device. For example, a data object may be a file, such as an image file, data file, database file, a software component, or any other type of computing information. Concurrent access of the same data object may result in corruption of a program's data structures, ultimately causing the computer to fail. Therefore, techniques have been created in an effort to manage access to data objects in a multi-threaded environment by locking the data object once accessed. However, such techniques have resulted in inefficient management of threads.

In general, thread requests in a multi-threaded environment fall into two categories, non-contended and contended. Non-contended cases occur when: (1) an exclusive acquire thread attempts to access a data object that is currently in a free state, i.e., unlocked; (2) a shared acquire thread attempts to access a data object that is not exclusively locked (i.e., being accessed by an exclusive acquire thread); (3) an exclusive release thread that attempts to release an exclusively acquired data object that has not met contention; and (4) a shared release thread that attempts to release a data object that is shared by one or more shared acquire threads and that has not met contention.

Contended cases result in two circumstances. First, when an exclusive acquire thread attempts to exclusively acquire a data object that is currently locked by another exclusive acquire thread or by a shared acquire thread. An exclusive acquire thread will always result in a contended case when a data object is locked by either a previous exclusive acquire thread or by one or more shared acquire threads. Second, a contended case also results when a shared acquire thread attempts to access a data object that is locked by an exclusive acquire thread.

FIG. 1 illustrates a block diagram of a typical lock that is used to manage access to a data object in a multi-threaded environment. In particular, a typical lock 101 includes three control bits, a shared owners count control bit 103, an exclusive control bit 105, and a waiters control bit 107. If there are no threads attempting to access the data object being managed by lock 101, each of the control bits 103-107 are low, or in a zero state, thereby indicating that the data object managed by the lock 101 is currently available.

With continued reference to FIG. 1, in a first example, exclusive acquire thread 121 attempts to acquire a data object (not shown) that is controlled by a lock 101 when that data object is in a free state. The lock 101 identifies that the data object is in a free state because the shared owner count 103 is in a zero or low state, the exclusive control bit 105 is in a zero or low state, and the waiters control bit 107 is in a zero or low state. In response to receiving an exclusive acquire thread 121, the lock 101 transitions to a lock 111 and includes a shared owner count of a low or zero state 113, an exclusive control bit 115 having a high or 1 state, and a waiters control bit 117 having a zero or low state. Transitioning the exclusive control bit 115 to a high state identifies the data object as being exclusively locked.

Another example of a non-contended case results from a shared acquire thread 131 attempting to access a data object that is currently not locked by an exclusive acquire. In such a case, the data object being accessed may have multiple shared acquire threads accessing the data object thereby resulting in a shared owners count 103 of any number illustrating the number of shared acquire threads currently accessing the data object. For example, if there were three shared acquire threads accessing the data object, the shared owners count 103 would have a value of 3. Because the object is not exclusively acquired, the exclusive control bit 105 is in a low state and the waiters control bit 107 is also in a low state. In response to receiving a shared acquire thread 131, the lock 101 transitions to the lock 111. The state of the lock 111 in response to a shared acquire thread 131 results in a shared owners count 113 being incremented by 1 from whatever the value of the shared owners count 103 contained in the lock 101. For example, if the shared owners count 103 had a value of 3, access by a shared acquire thread 131 would result in a shared owners count of 4. Likewise, because the acquire thread is a shared acquire and there is no contention, the exclusive control bit 115 remains low and the waiters control bit 117 also remains low.

Another non-contended case results from receipt of an exclusive release thread 141, to release a data object that is currently locked by an exclusive acquire thread. A data object is identified as being exclusively locked by the lock control bit 105 being high, the shared owners count control bit 103 being low and the waiters control bit 107 also being low. Receiving the exclusive release 141 results in a transition to lock 111 with a shared owners count 113 remaining low, an exclusive control bit 115 transitioning to a low state and the waiters control bit 117 remaining in a low state. The transition of the exclusive control bit 105 from a high state to an exclusive control bit 115 having a low state indicates that the data object controlled by the lock 101 is no longer locked (i.e., being accessed) by an exclusive acquire thread.

A shared release thread 151 releasing a data object that is not exclusively locked, identified by the exclusive control bit 105 being low, also results in a non-contended case. A data object controlled by a shared lock may be shared by multiple shared acquire threads, as illustrated by shared owners count 103 being any number (N) identifying the number of shared acquires currently accessing the data object. In response to receiving a shared release 151, the lock 101 transitions to the lock 111 and the shared owners count 113 is decremented by 1, illustrating the release of one shared acquire thread. The shared owners count 113 is decremented by 1 for all shared releases where the shared owners count is greater than or equal to one. The exclusive control bit 105 remains in a low state when it transitions to the exclusive control bit 115. Likewise, the waiters control bit 107 maintains its low state when it transitions to the waiters control bit 117.

FIG. 2 illustrates a typical technique for managing multiple access requests in a multi-threaded environment using a lock 201 which transitions, in response to a contended request, to a lock 211 and a local wait block 221. The local wait block is added to a local wait block list. As discussed above, a contended case will result when an exclusive acquire thread 231 attempts to access a data object that has either previously been locked by an exclusive acquire thread or is currently locked and being accessed by one or more shared acquire threads. In a first example, the lock 201 identifies that a data object is exclusively locked by setting the exclusive acquire control bit 205 to a non-zero state. Alternatively, the lock 201 indicates that a data object is locked and being accessed by one or more shared acquire threads by indicating the number of shared acquire threads currently accessing the data object in the shared owners count control bit 203.

With continued reference to FIG. 2, in response to receiving an exclusive acquire thread 231 which results in a contended case, the lock 201 transitions to a lock 211 which contains a pointer 219 to a local wait block 221 and a waiters control bit 213. Additionally, for a contended case, a local wait block 221 including a saved share count 223 and an exclusive control bit 225 is generated for the thread that has been denied access to the data object. The pointer block 219 includes a reference to the local wait block 221. Additionally, in response to receiving an exclusive acquire thread 231 which results in a contended case, the waiters control bit 207 transitions to a high state to a waiters control bit 213 which indicates that there is currently at least one thread waiting to access the data object. The local wait block 221 includes a saved share count 223 and an exclusive control bit 225. The saved share count control bit 223 maintains the number of shared acquires that were currently accessing the data object prior to receipt of the exclusive acquire thread 231. Additionally, the exclusive control bit 225 maintains the status of the thread that caused contention. In this instance, because the thread causing contention, the exclusive acquire thread 231, is exclusive, the exclusive control bit 225 transitions to a high state.

A shared acquire thread 241 results in a contended case when the data object being managed by the lock 201 is currently locked by a previous exclusive acquire, indicated by the exclusive acquire control bit 205 being in a high state. In response to receiving a shared acquire thread 241, the lock 201 transitions to a lock 211 which includes a pointer 219 containing a reference to the local wait block 221 and increments the waiters control bit 213 by 1 to indicate the number of threads currently awaiting access to the data object, in this case one. Likewise, in response to receiving a shared acquire thread 241 which results in a contended case, the local waiters block 221 maintains a saved share count 223 which, in this example, will be zero (because the data object was locked by an exclusive acquire) and an exclusive acquire control bit 225 will transition to a low state, because the thread causing contention is a shared acquire thread 241.

In a typical case, after a contended case has caused one or more local wait blocks to be added to a local wait block list, releases are more complicated. Typically, the following rights are granted to a releasing thread (shared or exclusive) that is attempting to release an acquired data object that has met contention: (1) shared release threads are allowed to search the local wait block list until they identify a wait block with a non-zero saved share count (this will be a wait block marked exclusive). The thread is allowed to use an interlocked operation to decrement that value. If this thread transitioned the value to zero, then it attains the rights of an exclusive releasing thread; (2) exclusive releasing threads are allowed to search the local wait block list until they find a continuous chain of shared wait blocks or they find the last wait block in an exclusive waiting thread.

Additional acquires that meet contention are added to the head of the local wait block list. Once there is a contended case, all attempted acquires are queued in the local wait block.

In the current implementation of locks, as described above, ownership of the lock is passed from thread to thread. However, this results in a problem as releasing threads must traverse the local wait list to find the next thread to wake. As a result, the lock hold time on a data object is increased due to the increase in time to identify and wake the appropriate wait block and pass lock ownership to that thread. Thus, the wait block list is effectively protected by the lock itself.

Thus, there is a need for a system and method for efficiently managing thread requests for a data object in a multi-threaded environment that reduces wait time.

SUMMARY OF THE INVENTION

In accordance with an embodiment of this invention, a mechanism for managing a plurality of access requests for a data object is provided. The mechanism includes a lock control identifying whether a requested data object is in use and a waiter control identifying whether at least one of the plurality of access requests have been denied immediate access to the data object and is currently waiting for access to the data object. Additionally, the mechanism maintains a list optimize control identifying whether one of the plurality of access requests is currently optimizing a waiters list of access requests waiting to access the data object.

In accordance with another aspect of the present invention, a computer readable medium having computer-executable components for managing access to a data object is provided. The components include a waiters list component that maintains a respective wait block representative of each access request that have been denied immediate access to the data object and are waiting to access the data object, and a locking mechanism component that is used to control access to the data object. The locking mechanism includes a reference to the waiters list, and an list optimization control for the waiters list.

According to another aspect of the present invention, a method for maintaining a waiters list of access requests that are waiting to access a data object that is locked is provided. Upon receipt of an access request for the data object the method generates a wait block representative of the access request and adds the wait block to the head of the waiters list. Additionally, the method determines whether the waiters list is currently being optimized, and, if not, the waiters list is optimized. After optimization, the method determines whether the lock on the data object has been released, and, if so, the method allows at least one of the access requests identified by a wait block to attempt to access the data object.

In still another aspect of the present invention, a method for controlling access to a data object is provided. Upon receipt of a first exclusive access request for the data object, the method places an exclusive lock on the data object and allows the request to access the data object. If another access request for the data object is received, the method creates a wait block representative of the second access request and adds the wait block to a waiters list. In addition to adding the wait block to the waiters list, it is determined whether the waiters list is currently being optimized, and, if it is not being optimized, the second access request is allowed to optimize the waiters list.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present application relates to a system and method for managing requests for a data object in a multi-threaded environment by implementing a locking mechanism for that data object. Embodiments of the present invention are operational in numerous general purpose or special purpose computing system environments or configurations. Examples of well known computing systems, environments, and/or configurations that may be suitable for implementing the invention include, but are not limited to personal computers, server computers, laptop devices, multiprocessor systems, microprocessor-based systems, network PCs, minicomputers, mainframe computers, distributed computing environments that include any of the above systems or the like.

Additionally, the invention may be described in the general context of computer-executable instructions, such as program modules, being executed by a computer. Generally, program modules include routines, programs, objects, components, data structures, etc. that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices. While the present invention will be described with regard to illustrative embodiments, one skilled in the relevant art will appreciate that the disclosed embodiments should not be construed as limiting.

Figure 1:
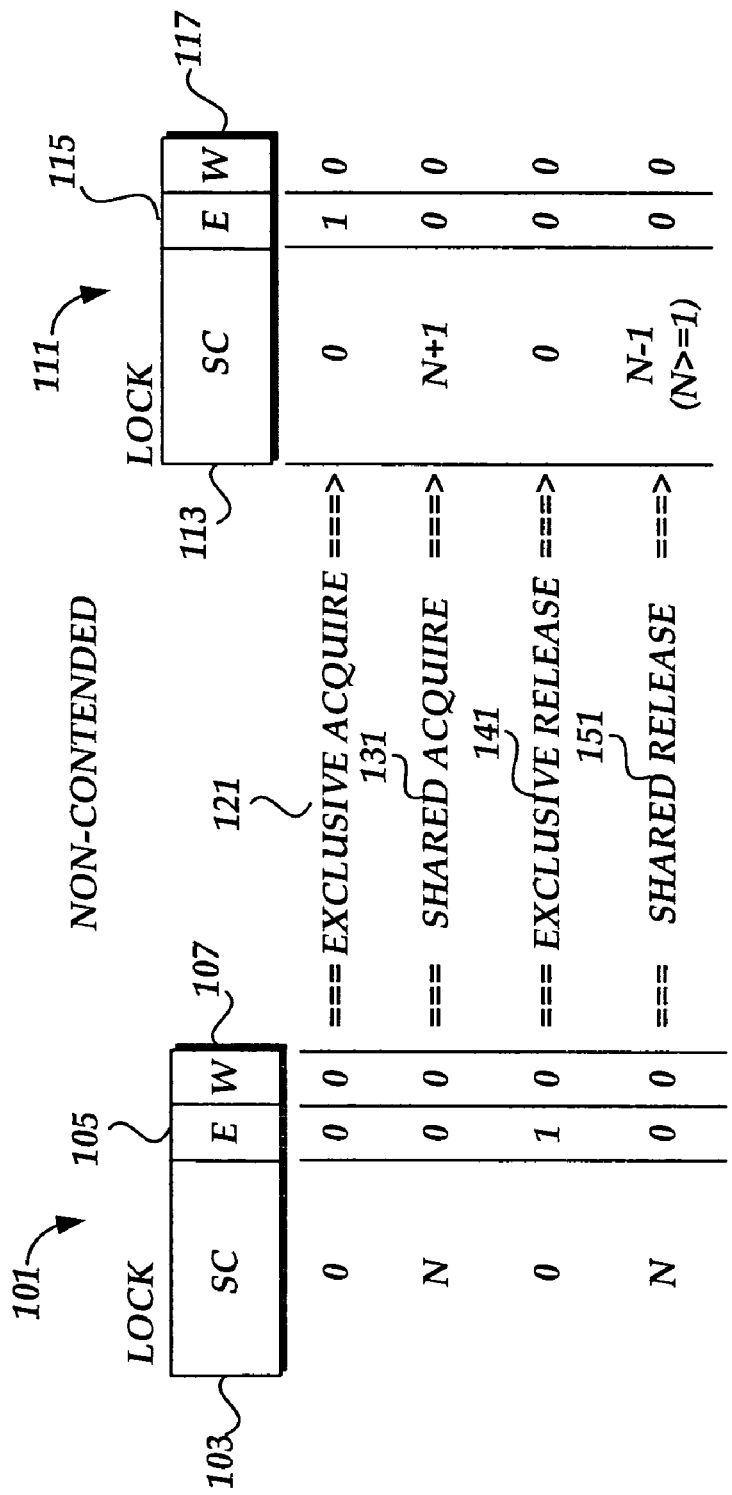
FIG. 1 illustrates the transition of a typical lock in response to receiving threads that result in a non-contended case.
Figure 2:
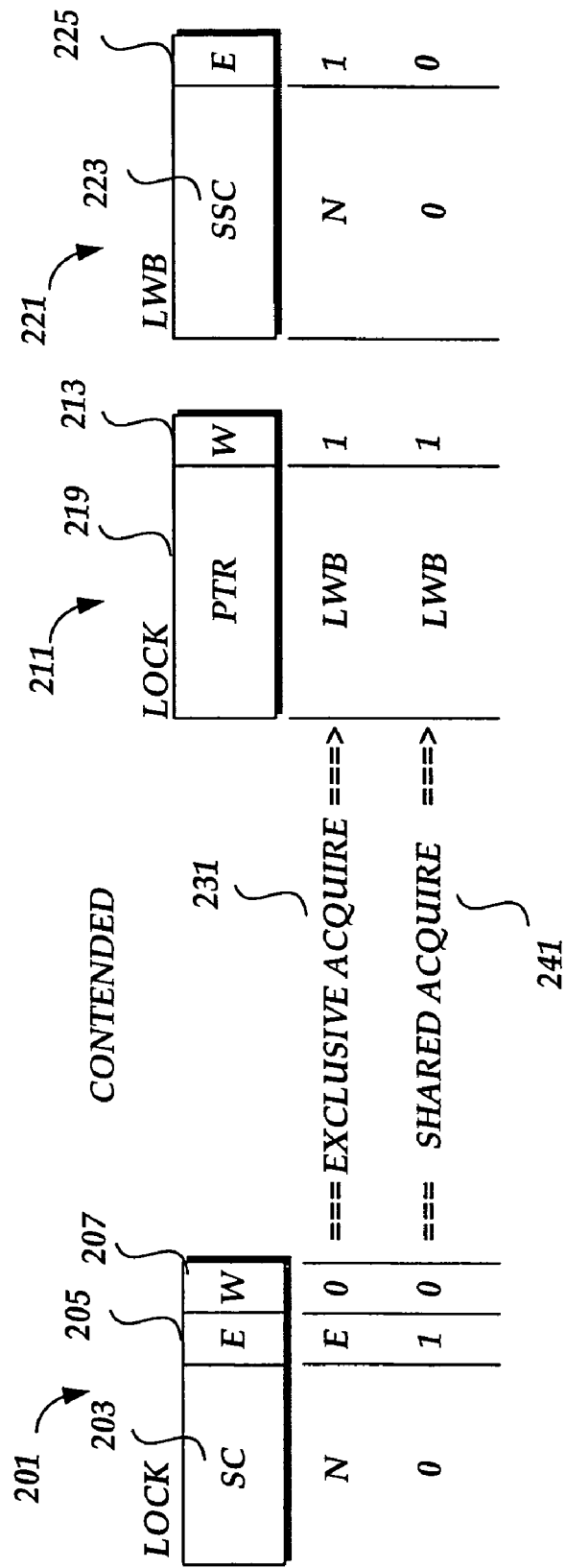
FIG. 2 illustrates a typical technique for managing multiple access requests in a multi-threaded environment using a lock which transitions, in response to a contended request, to a lock and a local wait block.
Figure 3:
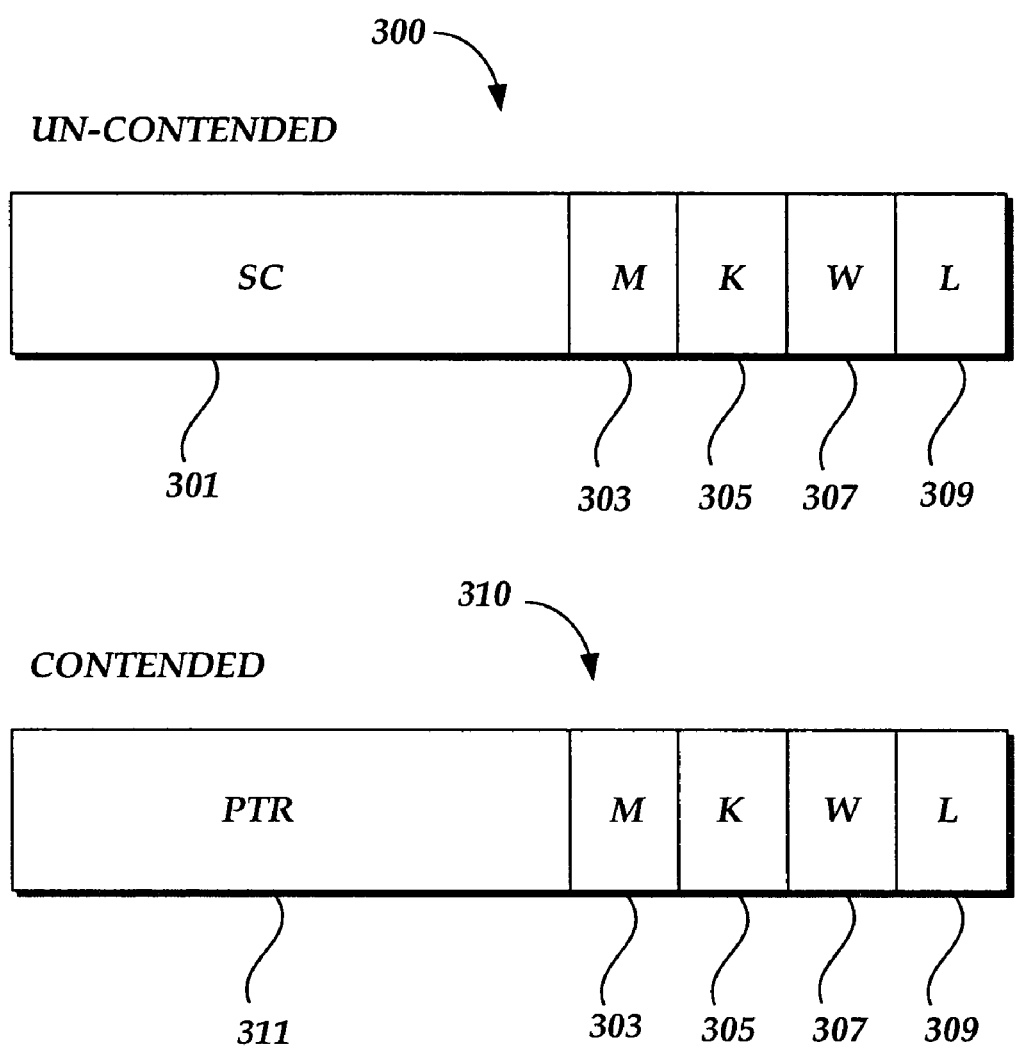
FIG. 3 illustrates a block diagram of a locking mechanism for managing access requests in a multi-threaded environment for both contended and non-contended cases, according to an embodiment of the present invention.

FIG. 3 illustrates a block diagram of a locking mechanism for managing access requests in a multi-threaded environment for both contended and non-contended cases, according to an embodiment of the present invention. The locking mechanism described herein provides the ability to manage both shared and exclusive thread requests to access a data object without passing ownership of locks from thread to thread.

In particular, FIG. 3 illustrates a lock 300 that is maintained for a data object that has only received non-contended threads, and a lock 310 that is maintained for a data object that has received one or more contended threads. The lock 300, 310 are embodied as data structures that may be manipulated, stored, and/or transmitted, as will be described below. Additionally, a lock 300, 310 may be embodied as part of the data object it is maintaining or may be a separate data structure. For example, the lock 300, 310 may be embodied as a pointer size object. As will be appreciated by one skilled in the relevant art, the bits that make up the locks may be arranged in any order and the described arrangement discussed herein shall not be considered as limiting embodiments of the invention to any particular arrangement.

In contrast to the locking mechanism typically used to manage thread requests for a data object in a multi-threaded environment, the locks 300 and 310 maintain four control bits: a multiple shared owners control bit 303, a list optimizer/waker control bit 305, a waiters control bit 307, and a lock control bit 309. Additionally, for non-contended cases, the lock 300 includes a share count control bit 301 which indicates the number of shared owners currently accessing the data object managed by the lock 300. For the contended case, the lock 310 maintains a pointer 311 to a local wait block contained within a local waiters list, as will be described below. In an actual embodiment, locks are not owned by a single thread but instead the lock provides the ability for threads to unconditionally release the locks thereby decreasing wait time. In contrast to previous locking techniques which pass ownership of locks from one thread to another, a releasing thread may release the lock and wake threads awaiting access, thereby allowing waiting threads and new threads to compete for access to the data object. In addition to decreasing wait time by unconditionally releasing locks, embodiments of the present invention limit waiters lists traversal time by tracking the end of the list, as described below.

The terminology used herein of control bits, setting control bits in a high or 1 state, and setting control bits in a low or zero state, is used for clarity and ease of discussion and is not intended to be limiting in any way. As one who is skilled in the relevant art will appreciate, any form or technique for tracking a particular state may be used with embodiments of the present invention.

The multiple shared owners control bit 303 is set if the lock is held shared by more than one thread. For non-contended cases, this control bit is not utilized and remains in the low state. The list optimize/waker control bit 305 is set by a thread that traverses the list to optimize the waiters list and/or wake threads. The list optimize/waker control bit 305 is zero in a non-contended case. The waiters control bit 307 indicates whether one or more threads have been denied immediate access to the data object and are currently awaiting access to that data object. The waiters control bit 307 is zero for the non-contended case and one for a contended case. In an alternative embodiment, the waiters control bit 307 may be used to indicate the number of threads that are waiting to access the data object. The lock control bit 309 is set for any type of access, exclusive or shared.

For the lock 310, that results in response to a contended case, a pointer 311 is generated which points to a waiters list. Additionally, the multiple shared owners control bit 303 is set if the lock is held shared by more than one thread. If it is non-zero, then multiple threads own the lock and the waiters list must be traversed to find the share count in the lock. The waiters control bit 307 is non-zero for the contended case.

Figure 4:
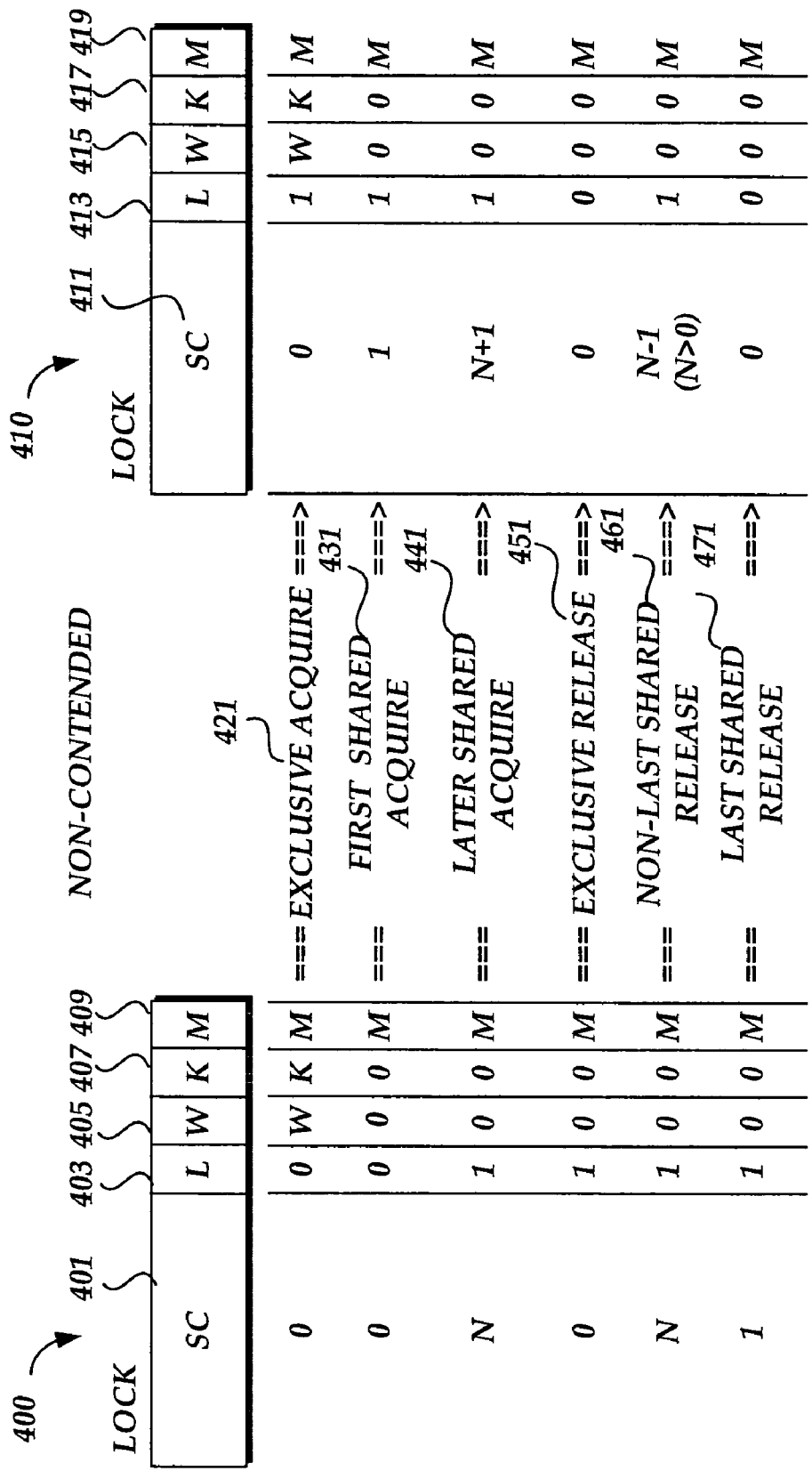
FIG. 4 illustrates the transition of a lock in response to non-contended cases, according to an embodiment of the present invention.

FIG. 4 illustrates the transition of a lock 400 in response to non-contended cases, according to an embodiment of the present invention. Non-contended cases result from an exclusive acquire thread attempting to access a data object that is currently not being shared by any other access request and is also not exclusively locked. Another non-contended case results from receipt of a first shared acquire when the data object being accessed is not locked. A later shared acquire will also result in a non-contended case when the data object is locked by a previous shared acquire. Releases which result in non-contended cases include an exclusive release that is releasing a data object that has been acquired by a non-contended exclusive acquire. A non-last shared release results in a non-contended case when the data object is currently locked and shared by more than one shared acquire. Finally, a last shared release will result in a non-contended case when the data object is locked by one shared acquire.

A data object that is currently not locked, as illustrated by the lock 400 having a share count of zero 401 and a lock control bit of zero 403 will result in a non-contended case when an acquire is received. For example, in response to receiving an exclusive acquire thread 421, the lock 400 locks the data object by transitioning lock control bit 403 from a low state to the lock control bit 413 being in a high state. By not passing ownership of locks to waiting threads, as previously required in the typical techniques, exclusive acquires may access an acquired data object that may have other threads waiting to access the data object, as illustrated by waiters control bit 405. Thus, in the transition from lock 400 to lock 410, in response to an exclusive acquire 421, the waiters control bit 405 remains the same, as illustrated by waiters control bit 415. Additionally, because the acquiring thread is an exclusive acquire thread 421, the share count 401 maintains its low state as share count 411. The multiple shared owners control bit 409 also maintains its low state as multiple shared owners count control bit 419 because there is no contention. For non-contended cases, the multiple shared owners control bit 419 is not utilized and thus its state is not relevant, as illustrated by the "M" in FIG. 4.

For a data object that is not locked and not shared, an access attempt by a first shared acquire thread 431 will result in a non-contended case. In particular, the lock 400 transitions to the lock 410 and the shared acquire is allowed access to the data object. The share count 401 of the lock 400 is incremented by one to a share count 411, illustrating that the data object is currently being accessed by one shared acquire. Likewise, because the data object was not previously locked, as illustrated by the lock control bit 403 being low, the lock control bit 403 transitions to a high state of the lock control bit 413 identifying that the data object is locked. The waiters control bit 415 and the list optimize/waker control bit 417 all remain in a low state. The multiple shared owners count bit 419 is not monitored for non-contended cases. In one example, the multiple shared owners control bit 419 may be placed in a low state for non-contended cases.

For a later shared acquire thread 441 that is attempting to access a data object that is currently being shared by one or more shared acquire threads will also result in a non-contended case. In such an instance, the lock 400 transitions to the lock 410 by incrementing the share count 401 by one, as illustrated by the share count 411, to identify that an additional shared acquire is accessing the data object. The lock control bit 403 will remain in a high state 413, as the object will remain locked. Additionally, because there is no contention, the waiters control bit 405 and the list optimize/waker control bit 407 will each remain low as the lock 400 transitions to the lock 410.

An exclusive release 451 that is releasing a data object that is locked by an exclusive acquire thread and has not received contention, also results in a non-contended case. As discussed above, a data object that is locked by an exclusive acquire thread, such as exclusive acquire thread 421, will have a lock control bit 403 in a high state. In response to receiving an exclusive releasing thread 451, the lock control bit 403 transitions from a high state to a low state, as illustrated by lock control bit 413. The other control bits, shared owners count 401, waiters control bit 405, and list optimize/waker control bit 407 will all remain low for this example, as no contention has occurred.

Finally, there are two cases for non-contended shared releases: non-last shared release threads 461 and last shared release threads 471. Both types of release threads may result when a data object is currently locked and shared by one or more shared acquire threads. In response to a non-last shared release thread 461, the share count control bit 401 of the lock 400 transitions by decrementing the share count by one as illustrated by the share count 411 of the lock 410. As discussed above, the shared owners count 401 identifies the number of shared acquire threads that are currently accessing the data object.

Because the releasing thread is a non-last shared release thread 461, the lock control bit 403 which is high for the lock 400 transitions to lock 410 having a lock control bit that remains high 413. The lock control bit remains high as there are other shared acquire threads still accessing the data object. In contrast, for a last shared release thread 471, both the share count 401 and the lock control bit 403 of the lock 400 transition to the lock 410 having a share count 411 of zero and a lock control bit 413 of zero. Both control bits transition to low or zero because there are no threads accessing the data object.

Figure 5:
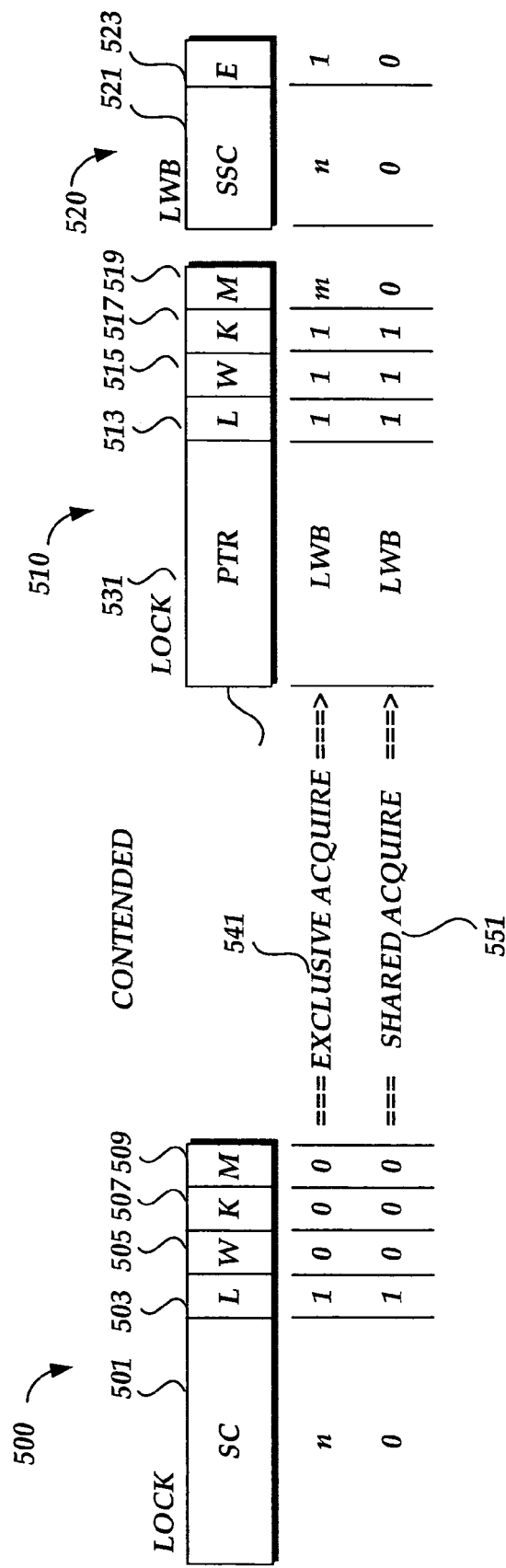
FIG. 5 is a block diagram illustrating the transition of a lock to a lock and a local wait block in response to a thread request in a multi-thread environment which results in a contended case, according to an embodiment of the present invention.
Figure 6:
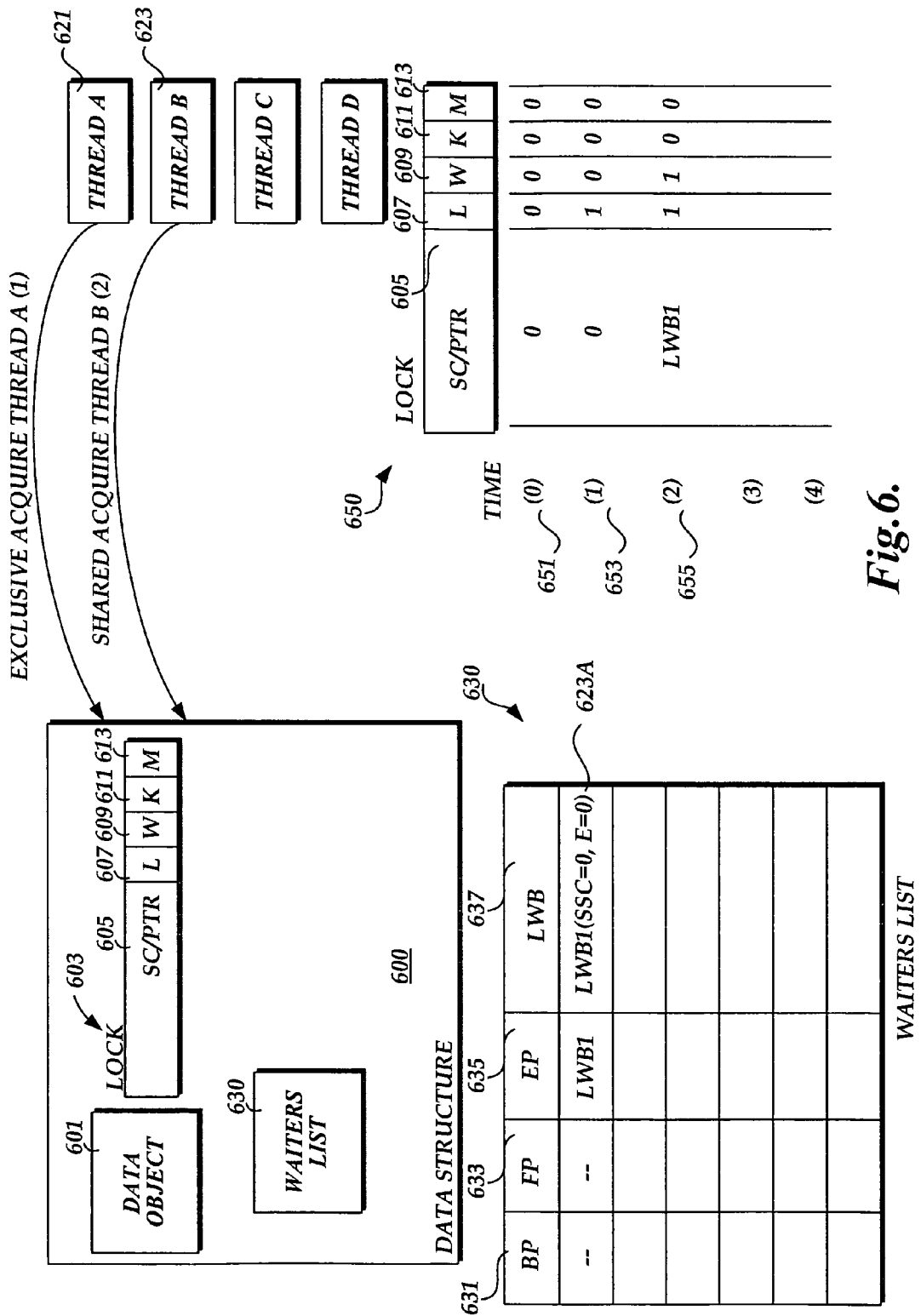
FIGS. 6, 7, 8, 9, and 10 illustrate a general example of a system and method for managing multiple access requests for a data object, according to an embodiment of the present invention.

FIG. 5 is a block diagram illustrating the transition of a lock 500 to a lock 510 and a local wait block 520 in response to a thread request in a multi-thread environment which results in a contended case, according to an embodiment of the present invention. Two examples of such contended cases are the receipt of an exclusive acquire thread 541 when a data object is currently locked by a shared acquire thread or by another exclusive acquire thread, and a case where a shared acquire thread 551 is received and the data object is locked by an exclusive acquire thread.

Referring first to an exclusive acquire thread 541 which results in a contended case when the data object is already locked by a lock 500. In a first instance, contention results when the lock 500 contains a share count 501 indicating the number of shared acquire threads that are currently accessing the data object. In a second instance, contention results when the lock 500 contains a share count 501 of zero and a high value for the lock control bit 503 thereby identifying that the data object is exclusively locked.

In response to receiving the exclusive acquire thread 541, in either instance, the lock 500 transitions to lock 510 which contains a pointer 510 to a local wait block 520 added to the head of a waiters list. Additionally, the lock control bit 503 will be maintained in a high state as the lock control bit 513, the waiters control bit 505 transitions to a high state (or remains high if previously set) to indicate the addition of a local wait block to the waiters list. Additionally, because the list optimize/waker control bit 507 was in a low state prior to receiving the exclusive acquire thread 541, the exclusive acquire thread 541 sets the list optimize/waker control bit 515 to a high state thereby allowing the thread to become a list optimizing thread and traverse the waiters list and optimize the local wait blocks contained within the waiters list, as described below. In an actual embodiment, if the exclusive acquire thread 541 is the first thread being added to the waiters list, the list optimize/waker control bit 515 is not set and the waiters list is not optimized, as this is the only thread awaiting access. Finally, the multiple shared owners control bit 509 is set to high if the shared owners count 501 (also saved share count 521) is greater than one when the exclusive acquire thread 541 is received. As discussed below, the multiple shared owners control bit 519 is used to optimize shared releases.

A local wait block 520 is generated in response to an exclusive acquire thread 541 that results in a contended case. The local wait block 520 contains a saved share count 521 that includes the share count that was previously maintained in the share count control bit 501 of the lock 500. Additionally, the local wait block 520 includes an exclusive waiter control bit 523 indicating that the wait block represents an exclusive acquire thread. As described below, the local wait block is added to the head of a waiters list. The waiters list is used to maintain access requests that have been denied immediate access to the data object.

A shared acquire thread 551 attempting to access a data object that is currently exclusively locked results in contention. An exclusive lock is identified by the lock 500 having a share count control bit 501 value of zero, and a lock control bit 503 value that is high. In response to a shared acquire thread 551 that results in contention, the lock 500 transitions to the lock 510 as follows. The lock 510 includes a pointer 531 which points to local wait block 520 generated in response to the shared acquire thread 551. Additionally, the lock control bit 513 maintains its high state as the data object remains locked. The waiters control bit 505 maintained by lock 500 is incremented by 1 to indicate the addition of a local wait block to the waiters list. Additionally, because the list optimize/waker control bit 507 of the lock 500 was low, the shared acquire thread 551 sets the list optimize/waker control bit 517 so that the thread may become the optimizing thread and traverse and optimize the waiters list, as described below. Finally, the multiple shared owners control bit 509 of the lock 500 is set to high if the shared owners count 501 (also saved share count 521) is greater than one when the shared acquire thread 551 is received.

In addition to setting the list optimize/waker control bit 517, the shared acquire thread 551 generates a local wait block 520 that contains a saved share count 521, which in this example is zero, that is the share count that was stored in the share count control bit 501 of the lock 500. Likewise, the local wait block 520 includes an exclusive wait control bit 523 which is not set because the acquiring thread is a shared acquire thread 551.

Referring now to FIGS. 6, 7, 8, 9, and 10, a general example of a system and method for managing multiple access requests for a data object, according to an embodiment of the present invention, will be described. The example described with respect to FIGS. 6-10 are for illustration purposes only and any variety and combination of threads (shared/exclusive) may attempt to access/release data objects in any number of ways in accordance with embodiments of the present invention.

Included in FIGS. 6-10 is a data structure 600 which contains one or more data objects, such as data object 601, and a lock 603 for controlling access to a data object. Also included in the data structure 600 is a waiters list 630, which is used to maintain local wait blocks representative of threads that have been denied immediate access to a data object. For this example, we will assume that an initial time, time="0" 651, a data object 601 is in a free state and the lock 603 which will manage access to the data object 601 has a share counter control bit 605 in a low state, a lock control bit 607 in a low state, a waiters control bit 609 in a low state, a list optimize/waker control bit 611 in a low state, and a multiple shared owners control bit 613 in a low state, all as illustrated in the timetable 650.

At time="1" 653, thread A 621, which is an exclusive acquire thread attempts to access data object 601. In response to the access request by thread A 621, the data object 601 is locked by transitioning the lock control bit 607 to a high state and thread A is allowed to exclusively access the data object 601. Because thread A 621 is an exclusive acquire thread, the share counter control bit 605 remains at a low state. Additionally, because this is the first thread to attempt to access the data object 601 and access was allowed, the waiters control bit 609 and multiple shared owners control bit 613 also remain in a low state. The list optimize/waker control bit 611 remains at a low state. Additionally, because no access request has been denied immediate access to the data object 601, the waiters list 630 has no local wait blocks contained within it for the data object 601.

Subsequent to the exclusive acquire thread A 621 accessing the data object 601, at time="2" 655, thread B 623, which is a shared acquire thread, attempts to access the data object 601 while thread A 621 is still accessing the data object 601. This results in a contended case, as described above. In response to the access request by thread B 623, immediate access is denied to thread B and a local wait block ("LWB1") 623A is generated which contains a saved share count of 0 and an exclusive acquire waiter control bit of 0. The saved share count is 0 because the previous share count of the lock 603 was at 0 because thread A 621 is an exclusive acquire thread. LWB1 623A is added to the head of the waiters list 630. Additionally, because LWB1 623A is the first wait block added to the waiters list 630, an end pointer 635 of the LWB1 623A is added to the waiters list, that points to itself. At this point a back pointer 631 and a forward pointer 633 for LWB1 623A are null. Additionally, because this is the first wait block to be added to the waiters list 630, the list optimize/waker control bit 611 is not set, as there is nothing in the waiters list to optimize.

Figure 7:
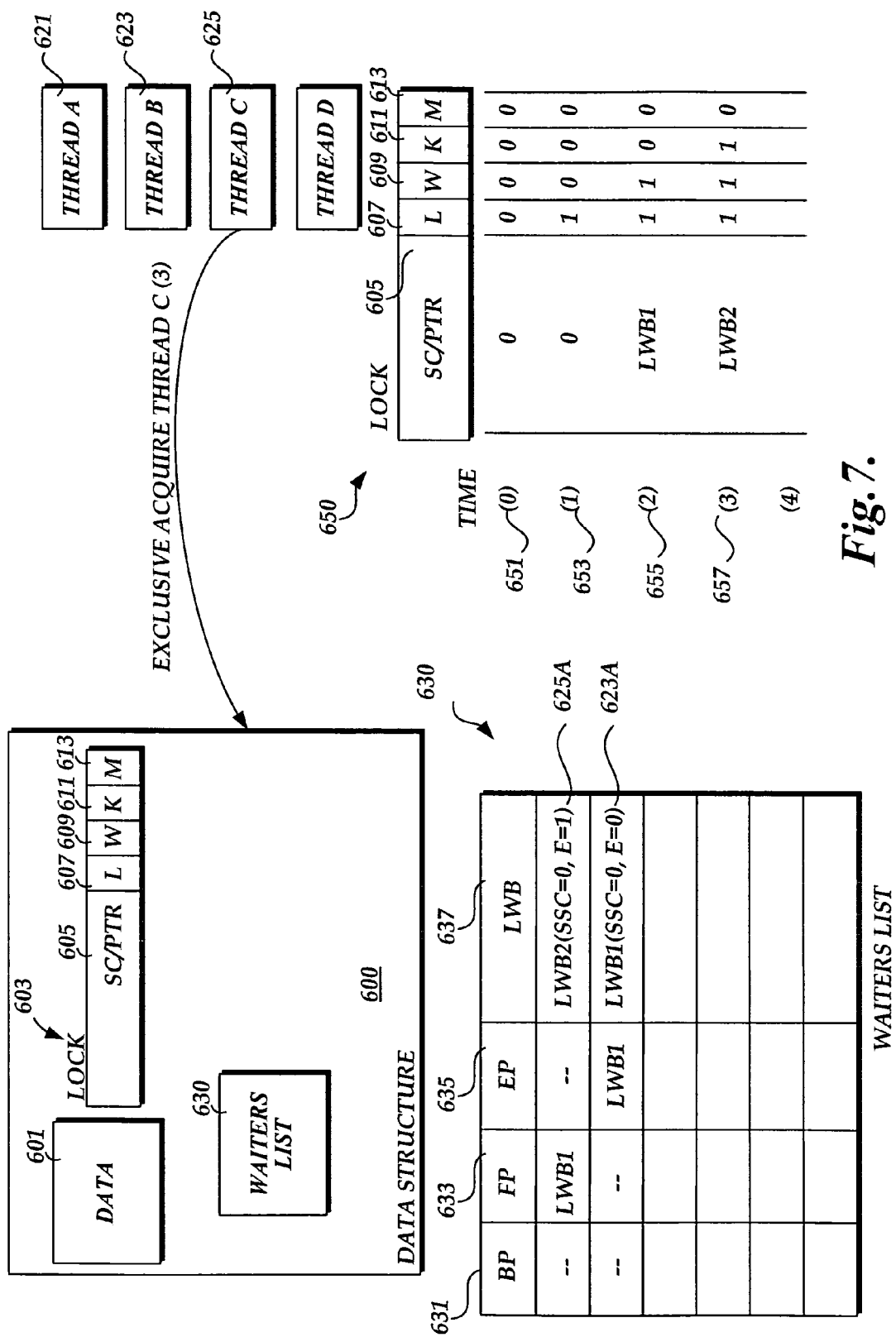

Referring now to FIG. 7, a third thread, thread C 625, at time="3" 657, attempts to access the data object 601. In this example, thread C 625 is another exclusive acquire thread. In response to receiving the exclusive acquire thread 625, immediate access is denied to thread C 625, and a local wait block LWB2 625A is generated with a saved share count of zero and an exclusive acquire control bit being set to high. The LWB2 625A is added to the waiters list 630, and thread C 625 attempts to set the list optimize/waker control bit 611. The LWB2 625A is added to head of the waiters list 630 and the lock 603 has its pointer 605 updated to point to the location of LWB2 625A within the waiters list 630. In addition to the LWB2 625A being added to the waiters list 630, the forward pointer 633 for LWB2 625A is included with a forward pointer to LWB1 623A. At this point, the end pointer 635 and the back pointer 631 for the LWB2 625A are unknown. However, because the list optimize/waker control bit 611 was successfully set by thread C 625, thread C 625 is allowed to optimize the waiters list, as illustrated and discussed with respect to FIG. 8.

Figure 8:
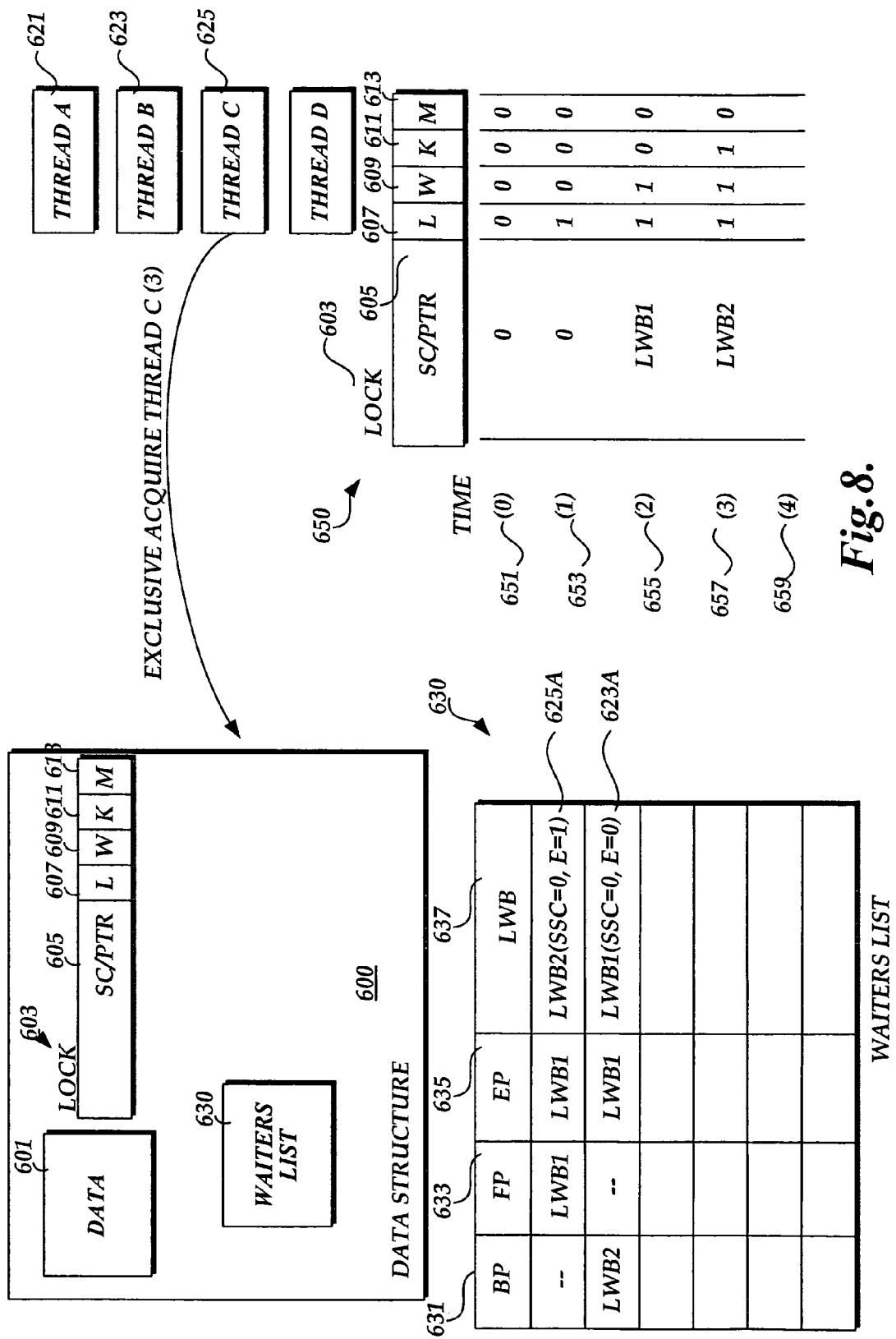

Referring now to FIG. 8, thread C 625 is allowed to optimize the waiters list 630 because it successfully set the list optimize/waker control bit 611 of lock 603. In optimizing the waiters list 630, thread C 625 fills in the forward pointers 633 and back pointers 631 of the local wait blocks currently contained in the waiters list 630. For example, the end pointer 635 for LWB2 625A is filled in to point to LWB1 623A because it is the local wait block contained at the end of the waiters list 630. Likewise, the back pointer for LWB1 623A is filled in to include a pointer back to LWB2 625A because LWB2 625A is the block immediately behind LWB1 623A. After thread C 625 has completed optimization of the waiters list 630, it releases control of the list optimizer/waker control bit 611.

In an actual embodiment, threads that meet contention attempt to add their respective local wait block onto the head of the waiters list and automatically set the list optimize/waker control bit at the same time. If the list optimize/waker control bit is already set, then another thread is optimizing the waiters list. If the thread manages to set the list optimize/waker control bit at the same time as adding itself onto the list, it becomes the optimizing thread. The list optimize/waker control bit is not a lock control bit, as no thread ever waits to set it. It is a gating mechanism for waking and optimizing the waiters list and only one thread needs to do this at any time. Optimizing threads (those that set the list optimize/waker control bit) traverse the waiters list and fill in back pointers and end pointers so that release requests can quickly get to the end of the waiters list.

Once the list optimization has been completed, the optimizing thread attempts to clear the list optimize/waker control bit. At this point, if the lock is unlocked, the thread becomes a waker thread by breaking the chain and waking the end threads thereby allowing those threads to again attempt to access the data object. However, if the lock is still locked when the optimizing thread attempts to release the list optimizer/waker control bit, then the list optimize/waker control bit is just cleared. Threads releasing the lock also attempt to set the list optimize/waker control bit if they are the last shared release or an exclusive release. If they succeed in setting the list optimize/waker control bit, they wake threads at the end of the waiters list.

Figure 9:
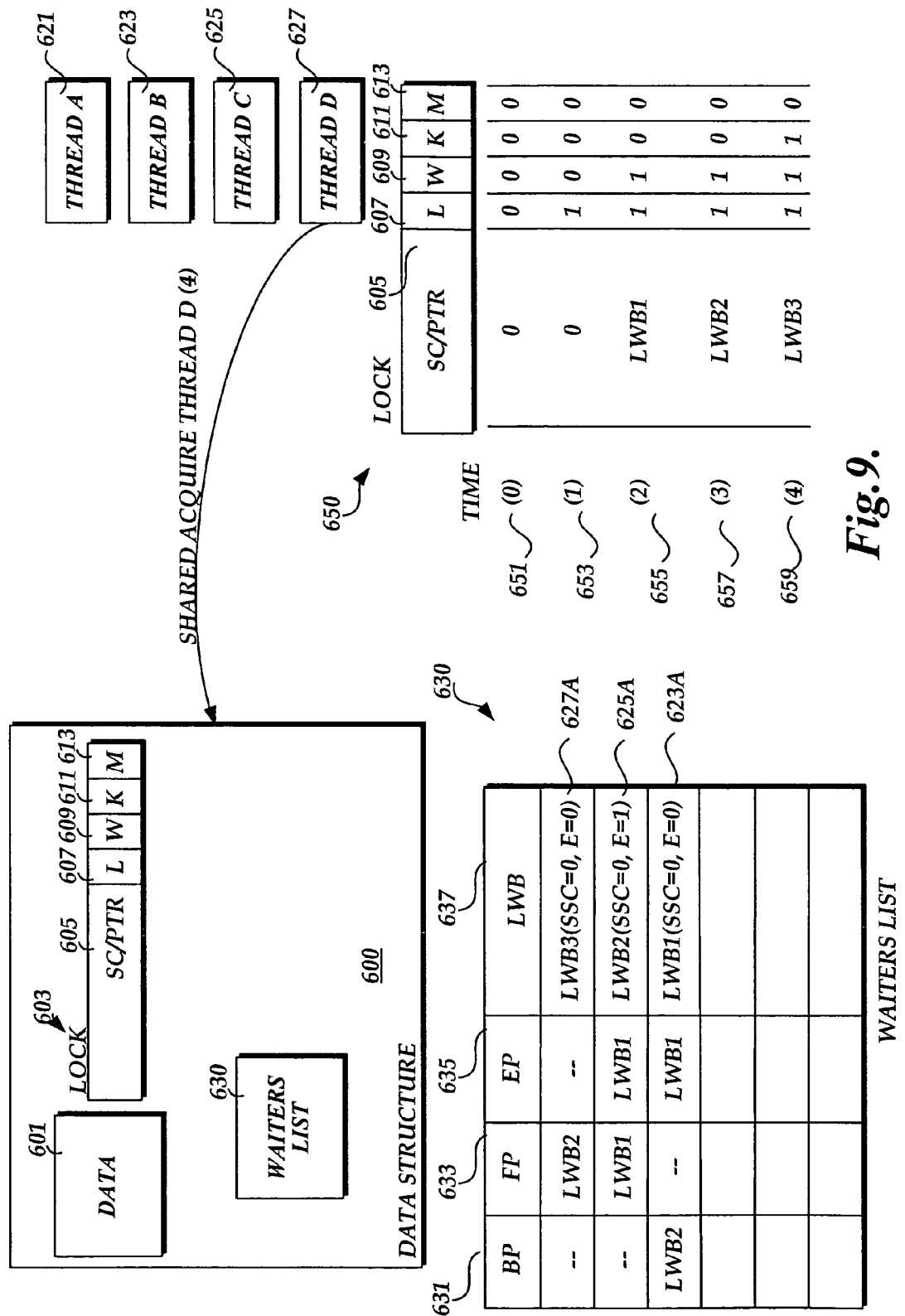

Referring now to FIG. 9, thread D 627, at time="4" 659, attempts to access data object 601. In particular, thread D 627 is a shared acquire thread. In response to receiving the shared acquire thread request, immediate access is denied to thread D 627, a local wait block ("LWB3") 627A is generated and added to the head of the waiters list 630, and thread D 627 attempts to set the list optimize waker control bit 611. In adding LWB3 627A to the waiters list 630, a forward pointer 633 for LWB3 pointing to LWB2 625A is included. At this point, the end pointer 635 and the back pointer 631 for LWB3 627A are unknown. Because the previous thread, thread C 625, had completed optimization of the waiters list 630 and released control of the list optimize/waker control bit 611, thread D 627 is successful in setting the list optimize/waker control bit 611 and thereby becomes the optimizing thread of the waiters list 630.

Figure 10:
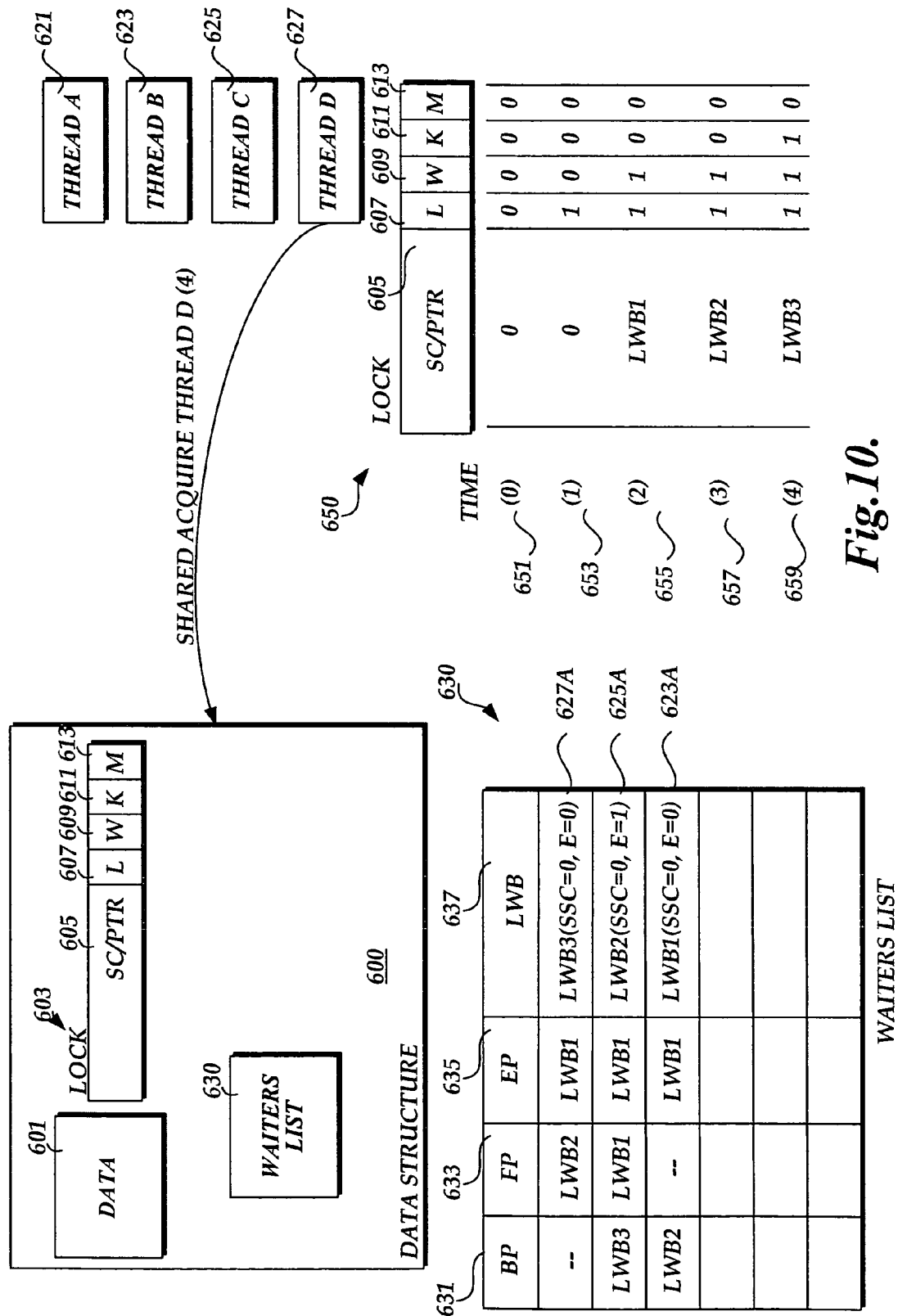

Referring now to FIG. 10, in optimizing the waiters list 630, thread D 627 fills in the unknown end pointers 635 and back pointers 631 for LWB3 627A. In particular, an end pointer 635 is added to include a pointer to LWB1 635, which is the last local wait block in the waiters list 630. Similarly, the back pointer 631 for LWB2 625A is filled in to include a pointer back to LWB3 627A. Upon completion of optimization of the waiters list 630, thread 627 releases control of the list optimize/waker control bit 611.

Optimizing the waiters list 630 to include back pointers 631, forward pointers 633 and end pointers 635 for each local wait block allows a releasing thread to quickly traverse the waiters list, thereby reducing the time required to identify the appropriate thread for release.

Figure 11:
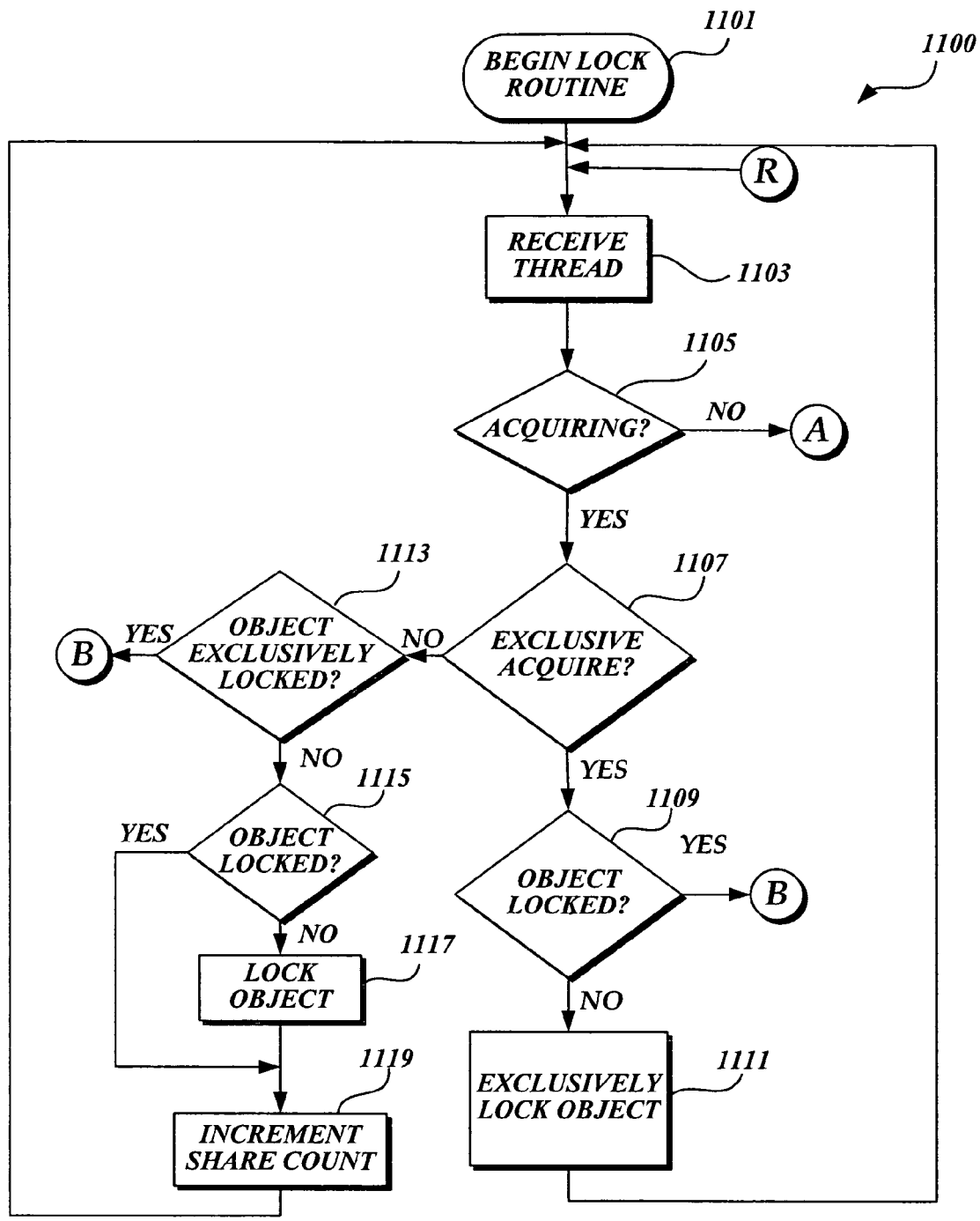
FIGS. 11, 12, 13, and 14 are a flow diagram illustrative of a lock routine for managing access requests for a data object, according to an embodiment of the present invention.

FIG. 11 is a flow diagram illustrative of a lock routine 1100 for managing access requests for a data object, according to an embodiment of the present invention. As one who is skilled in the art will appreciate, FIGS. 11, 12, 13, and 14 illustrate blocks for performing specific functions. In alternative embodiments, more or fewer blocks may be used. In an embodiment of the present invention, a block may represent a software program, a software object, a software function, a software subroutine, a software method, a software instance, a code fragment, a hardware operation, or a user operation, singly or in combination.

Referring to FIG. 11, at block 1101 the lock management routine 1100 begins and a thread from a program in the multi-threaded environment is received, as illustrated at block 1103. At decision block 1105 it is determined whether the received thread is an acquiring thread. As discussed above, an acquiring thread may be an exclusive acquire thread or a shared acquire thread. If it is determined at decision block 1105 that the received thread is an acquiring thread, a determination is made as to whether the received thread is an exclusive acquire thread, as illustrated by decision block 1107. If the received thread is an exclusive acquire thread, it is determined if the requested data object is currently locked, as illustrated by decision block 1109. If it is determined at decision block 1109 that the object is not locked, the exclusive acquire thread is allowed to access the requested data object and the accessed data object is exclusively locked so that no other request may access the data object, as illustrated by block 1111.

Referring back to decision block 1107, if it is determined that the received acquire thread is not an exclusive acquire thread, a determination is made as to whether the data object is exclusively locked by a previously received exclusive acquire thread, as illustrated by decision block 1113. If the requested data object is not exclusively locked, at decision block 1115 it is determined whether the requested data object is locked by a previously received shared thread, as illustrated by decision block 1115. If at decision block 1115 it is determined that the requested data object is not locked by a shared thread, at block 1117 the shared acquire thread is allowed to access the requested data object, a shared lock is placed on that data object, and the share count maintained within the shared lock is incremented, as illustrated at block 1119. However, if it is determined at decision block 1115 that the object is locked by another shared acquire thread, the shared acquire thread is allowed to access the data object and the share count in the previously existing lock is incremented to identify the addition of a shared acquire thread for that data object.

Figure 14:
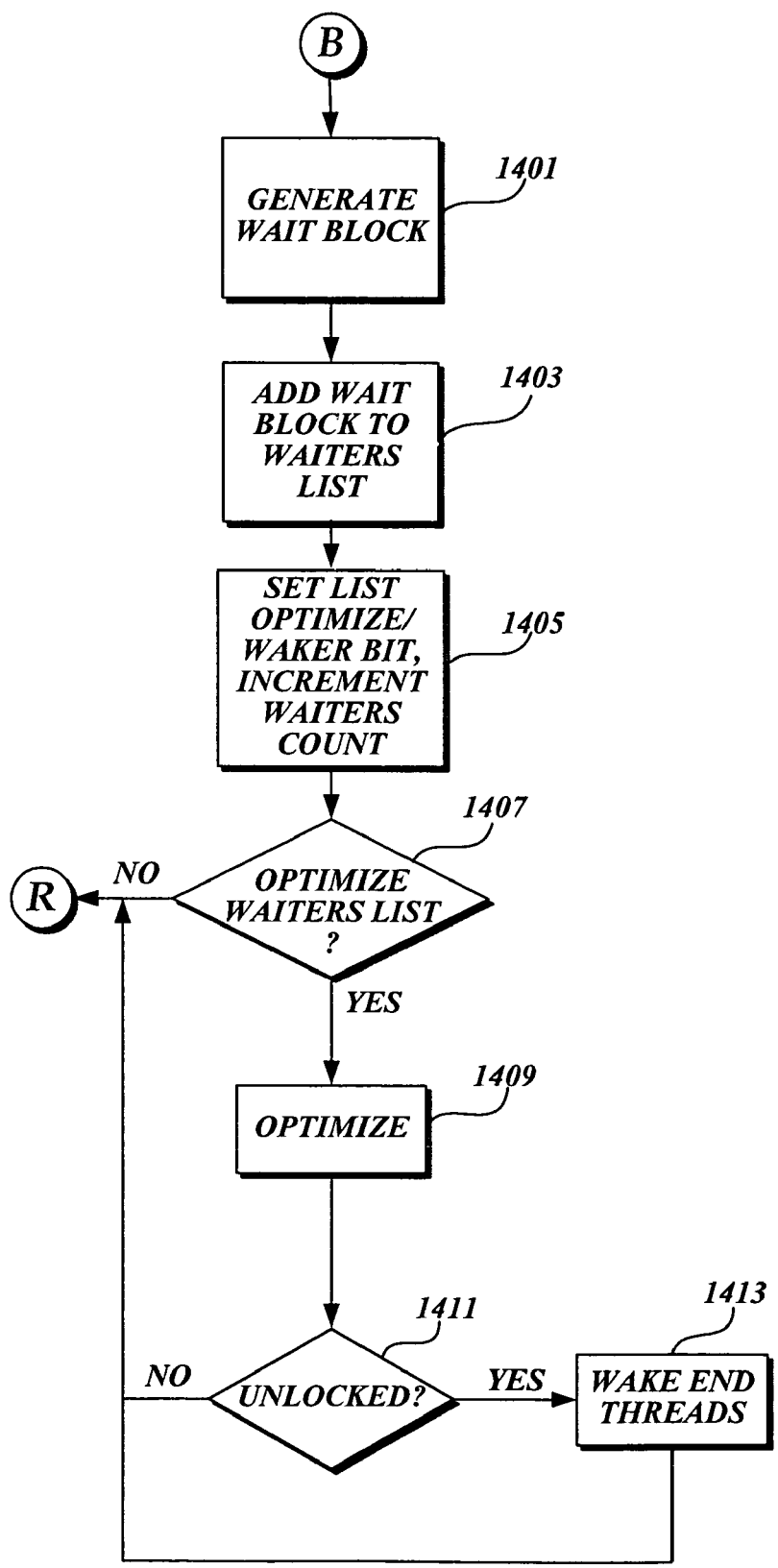

Referring back to decision block 1113, if it is determined that the received acquire thread is an acquiring thread that is not an exclusive acquire thread (i.e., it is a shared acquire thread) and that the object is already exclusively locked, the thread is denied immediate access to the data object and a wait block representative of the requesting thread that has been denied access is generated, as illustrated by block 1401 (FIG. 14). Upon generation of a wait block, at block 1403, the wait block is added to the waiters list. In addition to adding the wait block to the waiters list, the thread that has been denied immediate access attempts to set the list optimize/waker control bit, thereby becoming an optimizing thread for the waiters list, and increments the waiters count control bit in the existing lock for that data object, as illustrated by block 1405. In an actual embodiment, if this is the first wait block being added to the water's list, the list optimize/waker control bit is not set, as there is nothing to optimize.

If it is determined at decision block 1407 that the thread succeeded in setting the list optimize/waker control bit at block 1405, that thread becomes the optimizing thread for the waiters list and optimizes the waiters list, as illustrated by block 1409. Optimizing threads (those that succeed in setting the list optimize/waker control bit) traverse the waiters list and fill in back pointers and end pointers so that releasing threads can get to the end of the list quickly. Once list optimization has completed, the optimizing thread attempts to clear the list optimize/waker control bit. At this point, if the data object has been unlocked, the thread becomes a waker thread and wakes the end threads of the waiters list. However, if the data object remains locked, once the waiters list optimization thread has completed optimizing the waiters list, then the list optimize/waker control bit is simply cleared.

During optimization, the optimizing thread fills in previous pointers for all wait blocks after the first wait block until it meets a wait block with an end pointer that is not null. A wait block with an end pointer that is not null identifies the beginning of the waiters list last optimized by the optimizer (possibly by a different optimizing thread). The previous pointer for a block containing an end pointer is filled in by the list optimizing thread and the first block encountered by the optimizing thread has its end pointer filled in to point to the block containing the end pointer that points to itself. In an alternative embodiment, the end pointers for each block encountered by the optimizing thread are filled in to point to the end wait block. In this way the waiters list is updated to reflect its state at the start of the walk by the optimizing thread. New blocks may be added onto the head of the waiters list at any time while the optimizing thread is optimizing the waiters list. As such, the optimizing thread will see the new blocks and optimize those wait blocks prior to attempting to clear the list optimize/waker control bit.

Each valid end pointer within a wait list points to the end wait block in the list. In an actual embodiment, the first wait block added to a waiters list has its end pointer pointing to itself so that list optimizing threads can check only the end pointer. Previous pointers are also filled in from the first block with an end pointer to the last block. Previous pointers are used to wake threads in reverse order of waiting.

After the threads have been awakened, as illustrated by block 1413, and/or after it is determined at decision block 1407 that the list optimize/waker control bit was not successfully set, the routine 1100 again awaits receipt of a new thread for that data object as illustrated by block 1103 (FIG. 11). Referring again to FIG. 11, if it is determined at decision block 1109 that the data object being requested by an exclusive acquire thread is locked, the system proceeds as described above with respect to FIG. 14.

Figure 12:
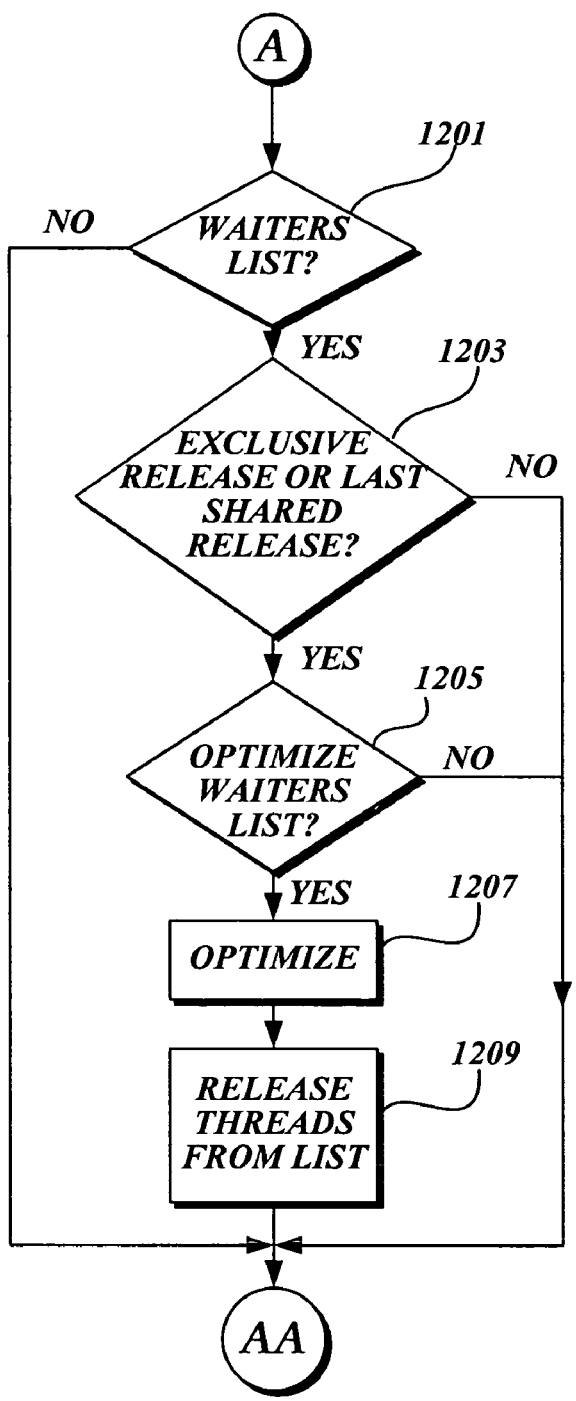

If it is determined at decision block 1105 (FIG. 11) that the received thread for a particular data object is not an acquiring thread (i.e., it is a releasing thread) it is determined whether there are currently any wait blocks contained in the waiters list, as illustrated by decision block 1201 (FIG. 12). If it is determined at decision block 1201 that there are wait blocks in the waiters list, it is determined whether the received releasing thread is an exclusive release or a last shared release, as illustrated by decision block 1203. If it is determined that the releasing thread is an exclusive release or a last shared release, that thread attempts to set the list optimize/waker control bit and thereby become the optimizing thread of the waiters list. At decision block 1205 it is determined whether the list optimize/waker control bit has been set and if so, the releasing thread is allowed to optimize the waiters list, as illustrated at block 1207. List optimization by a releasing thread optimizes the waiters list as discussed above with respect to block 1409 (FIG. 14). In addition to optimizing the waiters list, an exclusive release or last shared release that is allowed to optimize the waiters list also wakes/releases threads from the list upon completion of its optimization, as illustrated by block 1209.

However, if it is determined that either there are no wait blocks in the waiters list, as illustrated by decision block 1201, or that there is a waiters list and it is determined at decision block 1203 that the releasing thread is the last shared release, at decision block 1301 (FIG. 13) it is determined whether the releasing thread is an exclusive release.

Figure 13:
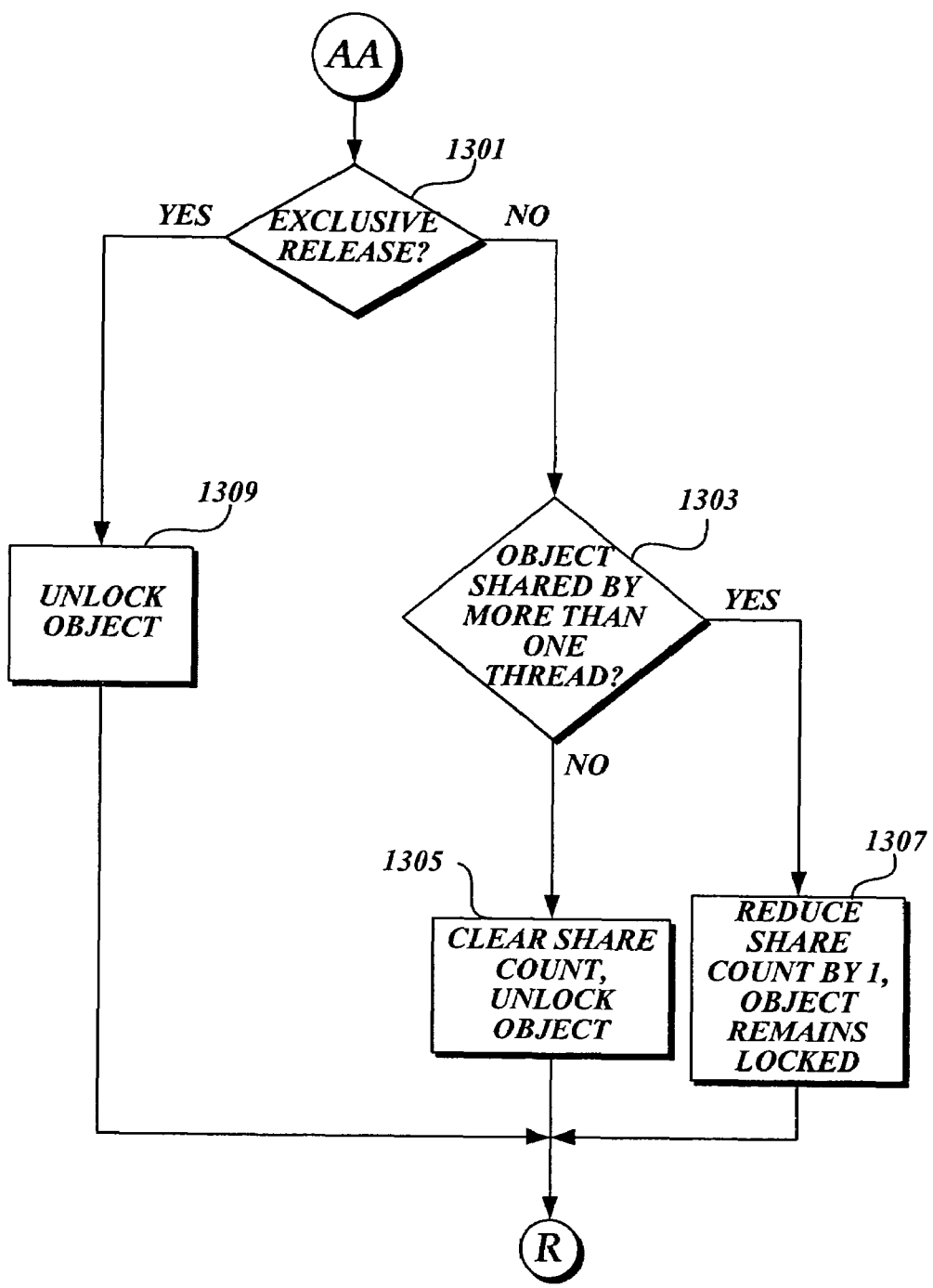

In FIG. 13, if it is determined at decision block 1301 that the releasing thread is not an exclusive release thread, a determination is made as to whether the data object is shared by more than one thread, as illustrated by decision block 1303. If it is determined at decision block 1303 that the data object is shared by more than one thread, the share count contained in the existing lock is reduced by one and the data object remains locked. However, if it is determined at decision block 1303 that the data object is not shared by more than one thread, the share count of the lock is cleared and the lock control bit is cleared, thereby unlocking the data object, as illustrated by block 1305.

Finally, if it is determined at decision block 1301 that the releasing thread is an exclusive release thread, the lock control bit for the lock maintaining access to the data object is cleared, thereby unlocking the object. After the data object has been unlocked, as shown by blocks 1309 and 1305, and/or after the object remains locked but the share count has been reduced by one (i.e., one of the shared acquires has completed its acquire and released), the routine 1100 returns to block 1103 (FIG. 11) and awaits receipt of another thread.

In an alternative embodiment, some lock uses may require a generic release. This is a common thread to release both an exclusive acquire and a shared acquire thread. For non-contended acquires, the release can transition easily by looking at the share count of the lock and either clearing the share count and the lock control bit (FIG. 13, 1305) or by reducing the share count by 1 and leaving the lock control bit in a high state (FIG. 13, 1307). However, for the contended case, the share count control bit is not available and the right to traverse the waiters list is not granted to exclusive releasers. However, referring to the multiple shared owners control bit, contended releases may be completed efficiently. The multiple shared owners control bit, if set, identifies that multiple shared acquirers own the lock and the releasing thread must traverse the list to identify and release the appropriate thread. If the multiple shared owners control bit is not set, then the acquiring thread was an exclusive acquire or a shared acquire with a share count greater than 1. For this case the lock control bit is just cleared. The multiple shared owners control bit also serves to optimize shared and generic releases by allowing some to proceed to unlock without any list walking. The multiple shared owners control bit also allows a shared acquire to access a shared data object even if there are acquiring threads currently waiting to access the data object.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A locking mechanism for managing a plurality of access requests for a data object executed on a computing device, comprising:
   a lock control identifying whether a requested data object is in use;
   a waiter control identifying whether at least one of the plurality of access requests have been denied immediate access to the data object and is currently waiting for access to the data object, the one of the plurality of access requests having an associated wait block representative of the access request, the wait block located at the front of a waiters list of access requests waiting to access the data object; and
   a list optimize control identifying whether one of the plurality of access requests is currently optimizing the waiters list;
   wherein the one of the plurality of access requests optimizing the waiters list of access requests is released when the requested data object is no longer in use.

2. The locking mechanism of claim 1, further comprising:
   a share count identifying a number of access requests that are currently sharing access to the data object.

3. The locking mechanism of claim 2, wherein the share count equals zero when the data object is being accessed by an exclusive access request.

4. The locking mechanism of claim 2, wherein the share count is greater than zero when the data object is being accessed by at least one shared access request.

5. The locking mechanism of claim 1, wherein the lock control identifies that the data object is in use when at least one of the plurality of access requests obtains access to the data object.

6. The locking mechanism of claim 5, wherein the at least one of the plurality of access requests is an exclusive access request.

7. The locking mechanism of claim 5, wherein the at least one of the plurality of access requests is a shared access request.

8. The locking mechanism of claim 1, wherein the waiter control identifies that at least one of the plurality of access requests is currently waiting for access to the data object.

9. The locking mechanism of claim 1, further comprising:
   a multiple share control identifying whether more than one of the plurality of access requests are currently sharing access to the data object.

10. The locking mechanism of claim 1, wherein each of the access requests that are denied immediate access to the data object attempt to optimize the waiters list by setting the list optimize control.

11. A computer-readable storage medium having computer-executable components for managing access to a data object, the components executed by a computing device comprising:
    a waiters list component, wherein the waiters list component maintains a respective wait block representative of each access request that has been denied immediate access to the data object and is waiting to access the data object, the access request having an associated wait block representative of the access request located at the front of the waiters list; and
    a locking mechanism component controlling access to the data object, wherein the locking mechanism component releases an access request that is no longer using the waiters list component, the locking mechanism comprising:
       a reference to the waiters list component; and
       an optimization control for the waiters list component.

12. The computer-readable medium of claim 11, wherein the optimization control identifies whether the waiters list component is currently being optimized by one of the access requests that are waiting to access the data object.

13. The computer-readable medium of claim 11, wherein at least one of the wait blocks in the waiters list component identifies an end wait block of the waiters list component.

14. The computer-readable medium of claim 11, wherein at least one of the wait blocks in the waiters list component identifies a previous wait block.

15. The computer-readable medium of claim 11, wherein at least one of the wait blocks in the waiters list component identifies a subsequent wait block.

16. The computer-readable medium of claim 11, wherein at least one of the wait blocks in the waiters list component identifies a number of access requests that were accessing the data object prior to the at least one of the wait blocks addition to the waiters list component.

17. The computer-readable medium of claim 11, wherein at least one of the wait blocks in the waiters list component identifies an end wait block of the waiters list component, a previous wait block, and a subsequent wait block.

18. The computer-readable medium of claim 11, wherein the locking mechanism includes an indication of a number of the access requests currently waiting to access the data object.

19. A computing device implemented method for maintaining a waiters list of access requests that are waiting to access a data object that is locked, the method comprising:
    receiving an access request for the data object;
    generating a wait block representative of the access request;
    adding the wait block to the front of the waiters list;
    determining whether the waiters list is currently being optimized;
    optimizing the waiters list when the waiters list is not currently being optimized;
    releasing the lock on the data object when the access request is no longer using the data object; and
    allowing at least one of the access requests identified by a wait block to attempt to access the data object when the lock in the data object has been released.

20. The method of claim 19, wherein allowing the at least one of the access requests identified by the wait block to attempt to access the data object includes allowing all of the access requests identified by the wait block to attempt to access the data object.

21. The method of claim 19, wherein allowing the at least one of the access requests identified by the wait block to attempt to access the data object includes allowing the first access request identified by the wait block added to the waiters list to attempt to access the data object.

22. The method of claim 19, wherein optimizing the waiters list includes:
    adding a reference to at least one of the wait blocks identifying the first wait block added to the waiters list.

23. The method of claim 19, wherein optimizing the waiters list includes:

adding a reference to at least one of the wait blocks identifying the wait block preceding the wait block to which the reference is added.

24. The method of claim 19, wherein optimizing the waiters list includes:
adding a reference to at least one of the wait blocks identifying the wait block subsequent to the wait block to which the reference is added.

25. The method of claim 19, wherein waiting for a next access request occurs when the waiters list is being optimized.

26. The method of claim 19, wherein waiting for a next access request occurs when the exclusive lock in the data object has not been released.

27. A computer-readable storage medium having computer-executable instructions that when executed by a computing device cause the computing device to:
receive an access request for the data object;
generate a wait block representative of the access request;
add the wait block to the front of the waiters list;
determine whether the waiters list is currently being optimized;
optimize the waiters list when the waiters list is not currently being optimized;
release the lock on the data object when the access request is no longer using the data object; and
allow at least one of the access requests identified by a wait block to attempt to access the data object when the lock in the data object has been released.

28. A computer system having a processor, a memory and an operating environment, the computer system operable to:
receive an access request for the data object;
generate a wait block representative of the access request;
add the wait block to the front of the waiters list;
determine whether the waiters list is currently being optimized;
optimize the waiters list when the waiters list is not currently being optimized;
release the lock on the data object when the access request is no longer using the data object; and
allow at least one of the access requests identified by a wait block to attempt to access the data object when the lock in the data object has been released.

29. A computing device implemented method for controlling access to a data object, the method comprising:
receiving a first exclusive access request for the data object;
placing an exclusive lock on the data object;
receiving a second access request for the data object;
creating a wait block representative of the second access request;
adding the wait block to a waiters list;
determining whether the first access request is using the data object;
releasing the exclusive lock on the data object when the first access request is not using the data object;
determining whether the waiters list is currently being optimized; and
allowing the second access request to optimize the waiters list when the waiters list is not currently being optimized.

30. The method of claim 29, further comprising:
including an indication in the exclusive lock that an access request is currently waiting to access the data object.

31. The method of claim 29, further comprising:
generating a pointer to the waiters list in response to adding the wait block to the waiters list.

32. A computer-readable storage medium having computer-executable instructions that when executed by a computing device cause the computing device to:
receive a first exclusive access request for the data object;
place an exclusive lock on the data object;
receive a second access request for the data object;
create a wait block representative of the second access request;
add the wait block to a waiters list;
determine whether the first access request is using the data object;
release the exclusive lock on the data object when the first access request is not using the data object;
determine whether the waiters list is currently being optimized; and
allow the second access request to optimize the waiters list when the waiters list is not currently being optimized.

33. The computer system having a processor, a memory and an operating environment, the computer system operable to:
receive a first exclusive access request for the data object;
place an exclusive lock on the data object;
receive a second access request for the data object;
create a wait block representative of the second access request;
add the wait block to a waiters list;
determine whether the first access request is using the data object;
release the exclusive lock on the data object when the first access request is not using the data object;
determine whether the waiters list is currently being optimized; and
allow the second access request to optimize the waiters list when the waiters list is not currently being optimized.

34. A computing device implemented method of optimizing a waiters list, the method comprising:
adding at least one wait block corresponding to an access request to a waiters list;
adding a reference to at least one of the wait blocks identifying the first wait block added to the waiters list;
adding a reference to at least one of the wait blocks identifying the wait block preceding the wait block to which the reference is added;
adding a reference to at least one of the wait blocks identifying the wait block subsequent to the wait block to which the reference is added;
releasing a lock on the waiters list when the access request is no longer using the waiters list; and
allowing the subsequent wait block access to the waiters list.

* * * * *